United States Patent [19]

Baker

[11] 4,249,978

[45] Feb. 10, 1981

[54] METHOD OF FORMING A HEAT RESISTANT CARTON

[75] Inventor: Thomas R. Baker, Los Altos, Calif.

[73] Assignee: Kliklok Corporation, Greenwich, Conn.

[21] Appl. No.: 31,459

[22] Filed: Apr. 19, 1979

[51] Int. Cl.³ .......... B32B 7/14; C09J 5/04

[52] U.S. Cl. .......... 156/291; 53/477; 53/484; 53/491; 493/129; 156/310; 156/315; 156/322; 156/332; 229/3.1; 229/48 SA; 229/48 SB; 229/48 T; 426/107; 426/113; 428/200; 428/483

[58] Field of Search .......... 156/227, 315, 291, 322, 156/310, 332; 428/200, 483; 427/207 D, 411, 261, 407 D; 53/477, 491, 484; 93/36 M, 36 MM; 229/48 SA, 48 SB, 48 T, 3.5 R, 3.1; 260/29.6 B; 426/107, 113

[56] References Cited

U.S. PATENT DOCUMENTS

| | | | |
|---|---|---|---|
| 2,424,110 | 7/1947 | Morrison et al. | 156/332 |
| 2,677,672 | 5/1954 | Luce | 260/29.6 RW |
| 2,758,432 | 8/1956 | Moore | 53/477 |
| 2,984,598 | 5/1961 | Gobalet | 156/322 |
| 3,054,703 | 9/1962 | Brasure | 156/309 |
| 3,140,215 | 7/1964 | Russell | 229/48 T |
| 3,197,429 | 7/1965 | Baatz | 260/29.6 B |
| 3,336,464 | 8/1967 | Hittenberger et al. | 219/374 |
| 3,354,606 | 11/1967 | Miller et al. | 53/76 |
| 3,565,712 | 2/1971 | McCarthy | 156/82 |
| 3,620,138 | 11/1971 | Neal et al. | 93/36.3 |
| 3,808,088 | 4/1974 | Knechtges et al. | 156/291 |
| 4,072,661 | 2/1978 | Shipman | 426/113 |
| 4,147,836 | 4/1979 | Middleton et al. | 426/113 |

*Primary Examiner*—John J. Gallagher

*Attorney, Agent, or Firm*—Lowe, King, Price & Becker

[57] ABSTRACT

A method of forming a heat-sealable carton having a pair of mating surfaces to be sealed includes the steps of coating at least one of the carton surfaces with a heat-activated thermosetting adhesive, spraying a fine mist of a water-based adhesive which exhibits high contact tackiness when dry, to form a discontinuous film on the coated surface, heating the water-based adhesive coated surface to a temperature sufficient to dry the water-based adhesive and activate the thermosetting adhesive, placing the mating carton surfaces in contact with each other and applying pressure for a time sufficient to seal the contacting surfaces together. A carton formed by the method is provided with flaps sealed by the combination of thermosetting heat-activated adhesive and high tack water-based adhesive. This allows the mating surfaces to be rapidly sealed by automatic carton closing apparatus and results in a sealed carton which exhibits good seal integrity at high temperatures. A carton formed in this manner is useful, for example, as a food container which can be placed directly in an oven to heat the contents thereof, with the carton seal being unaffected by the oven heat.

12 Claims, 8 Drawing Figures

Fig. 4
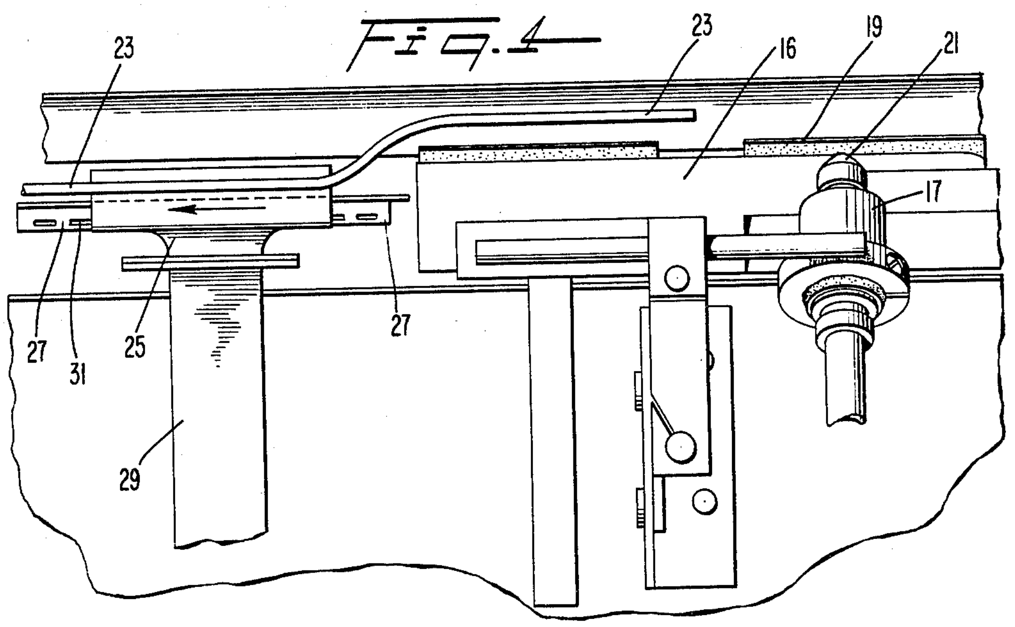
Fig. 5
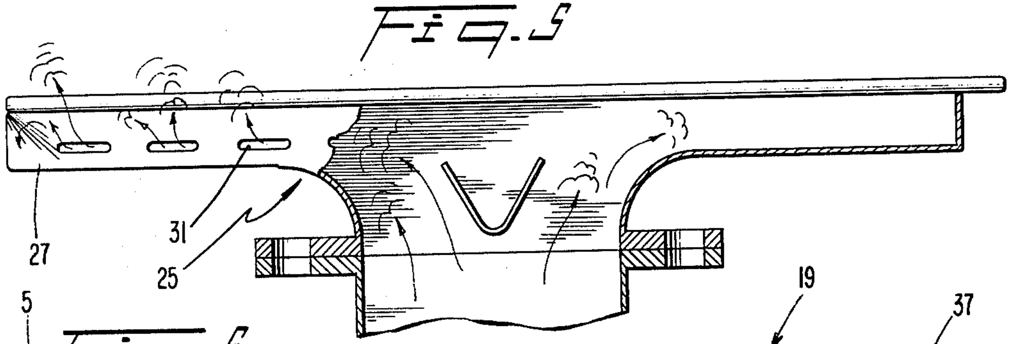
Fig. 6
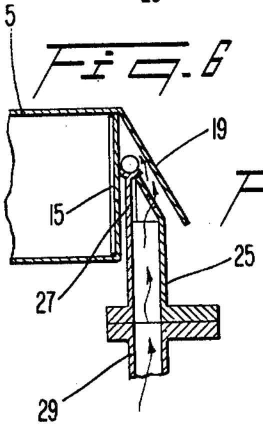
Fig. 7
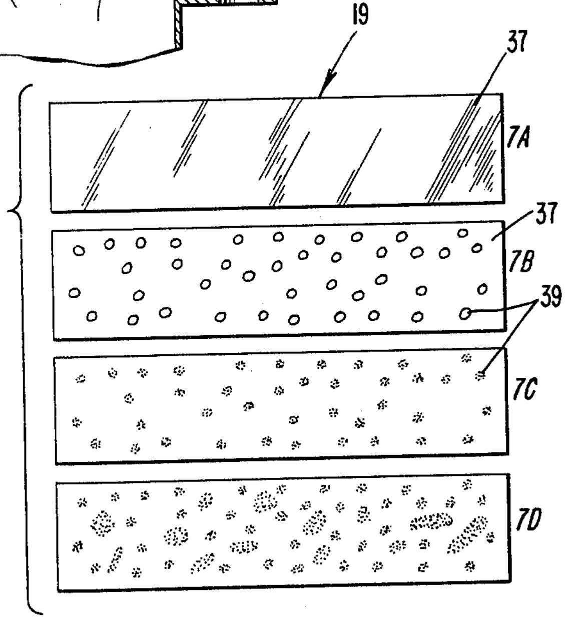
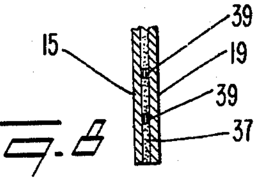
Fig. 8

METHOD OF FORMING A HEAT RESISTANT CARTON

BACKGROUND OF THE INVENTION

The invention relates to the field of heat-sealable cartons and, more particularly, to a process for forming a heat-sealable carton, and to the carton itself, which can be rapidly sealed and which exhibits good seal integrity at high temperatures.

Many varieties of cartons or containers formed from folded paperboard are known in the packaging art. For example, in packaging food items, such as frozen foods, it has been the practice to form a carton from plastic coated paperboard and to seal the carton closure flaps after insertion of the food items by automatic machinery, such as shown in the patent to Gobalet (U.S. Pat. No. 2,984,598), owned by the assignee of the present invention. Gobalet coats a water-based adhesive, such as polyvinyl acetate emulsion, on one of the carton flaps and then dries the water-based adhesive with heating lamps. The dried adhesive exhibits a high degree of contact tackiness. After the adhesive is dried, the adhesive coated surface of the flap is pressed against the carton and cooled to form a seal. The carton bonding method of Gobalet allows rapid bonding of the carton flaps and exhibits good sealing characteristics at the temperatures normally encountered by such packages, i.e., between approximately 0° F. and 100° F.

Recently, there has been a trend within the food industry to produce packaged foods which can be placed directly in micro-wave or conventional ovens for cooking or reheating. Many such packaged foods are cooked while covered or sealed, so as to retain moisture, flavor, and to prevent splatter in the oven. While heating of the package within a microwave oven rarely present problems, the temperatues necessary for cooking or reheating of packaged foods in a conventional oven often exceed 217° C.(425° F.). Many such so-called "ovenable" packages are coated with a heat-resistant polyester resin coating rather than a polyethylene coating or the like which would melt at oven temperatures. The polyester resin coating also prevents the paperboard from absorbing grease and cooking juices during cooking.

Polyester resin is a thermosetting resin which can be used as an adhesive when heated above approximately 225° to 550° F. with pressure being applied to the surfaces being bonded. An adhesive seal made with polyester resin exhibits good seal integrity at elevated temperatures (i.e., up to 230° C. or 450° F.). However, the compression needed to set such adhesives has previously been a substantial hindrance, since the possibilities for firm compression is often severely limited. In addition, thermosetting resins exhibit good bond strength only after the bond has cooled, which means that some method must be used to hold the carton edges together while the bond is curing. When using automatic carton sealing machinery, the long curing times of thermosetting resins also reduces the number of cartons which can be sealed in a given period of time and increases the size of the machine.

It is therefore an object of the present invention to provide a method of forming a heat-sealable carton exhibiting good seal integrity at high temperatures.

It is another object to provide a method of forming a heat-sealable carton which can be performed rapidly on a conventional carton sealing apparatus with little modification to the apparatus.

It is a further object to provide a heat-sealable carton, useful as a cooking or heating container for foods, which is formed by the process of the present invention.

SUMMARY OF THE INVENTION

These and other objects are achieved by the present invention wherein there is provided a method of forming a carton having at least a pair of mating surfaces to be sealed, the sealed surfaces exhibiting a high resistance to heat after sealing, comprising the steps of coating at least one of the carton surfaces with a heat-activated thermosetting adhesive, spraying a fine mist of a water-based adhesive emulsion which exhibits high contact tackiness when dry to form a discontinuous film on the coated surface, heating the water-based adhesive coated surface to a temperature sufficient to dry the water-based adhesive and activate the thermosettig adhesive, placing the mating carton surfaces in contact with each other, and applying pressure for a time sufficient to seal the contacting surfaces together.

In the preferred embodiment, the thermosetting adhesive is a polyester resin and the water-based adhesive is an aqueous emulsion of polyvinyl acetate. One or both mating surfaces of the carton can be coated with the thermosetting adhesive, water-based adhesive combination. The water-based adhesive is dried and the thermosetting adhesive is activated by directing a stream of heated air at the coated carton surface. Preferably, only one surface of the carton is so cooled and heated, the unheated mating surface of the carton acting as a heat sink to aid in cooling and curing of the sealed surfaces. Heating temperatures for the thermosetting resin is in the range of 110° C.–290° C. (225° F.–550° F.).

The combination of thermosetting adhesive and high tack water-based adhesive enables the mating surfaces of the carton to be rapidly sealed by automatic carton sealing apparatus, and results in a sealed carton which exhibits good seal integrity at high temperatures. When the water-based adhesive is dried by a stream of hot air, the adhesive becomes quite tacky and the carton surfaces are quickly sealed when pressed together. The heated air also activates the thermosetting adhesive to form a high-strength, heat-resistant seal between the carton surfaces when the adhesive cures after cooling. Since the thermosetting resin by its inherent nature can be activated only once and this occurs during this sealing operation, the seal is assured of holding after curing when the carton is reheated, such as in an oven for cooking the contents. The use of water-based adhesive enables the carton surfaces to be rapidly sealed and securely held together while the thermosetting adhesive cures. Since the water-based adhesive is applied as a discontinuous film, it does not interfere with the curing and bonding of the thermosetting adhesive. Sealing can be accomplished in as little as one-half second per carton using automatic machinery. In a high speed closing operation where firm compression is not available, the sealing of the present invention is effective even if only one of the mating surfaces is coated. Previously, experience had taught that both surfaces must be coated with an adhesive forming plastic in order to form an effective bond under these conditions.

The carton formed by the described method is useful, for example, as a container for food which can be placed in its sealed condition directly in an oven to cook or heat the contents of the container. The coating of polyester resin or the like prevents absorption by the carton of grease or cooking juices.

BRIEF DESCRIPTION OF THE DRAWING FIGURES

These and other objects, features and advantages of the present invention are presented in the following detailed description of the preferred embodiment and illustrated in the accompanying drawing figures wherein:

FIG. 4 is a detailed side view of the carton-sealing apparatus of FIG. 1 in which the adhesive spraying and carton heating sections are shown;

FIG. 5 is a more detailed view of the carton panel heater shown in FIG. 4;

FIG. 6 is a detailed side view of the carton panel heater section of FIG. 3 showing the arrangement of the heater with respect to a carton to be sealed;

FIG. 7A, 7B, 7C and 7D illustrate the respective appearance of a carton panel surface before and after coating with a thermosetting adhesive, spraying of a water-based adhesive, drying of the water-based adhesive, and final bonding and curing of the sealed carton surface; and FIG. 8 is a magnified cross-sectional view of the carton panels after sealing.

DESCRIPTION OF THE PREFERRED EMBODIMENT

Figure 1:
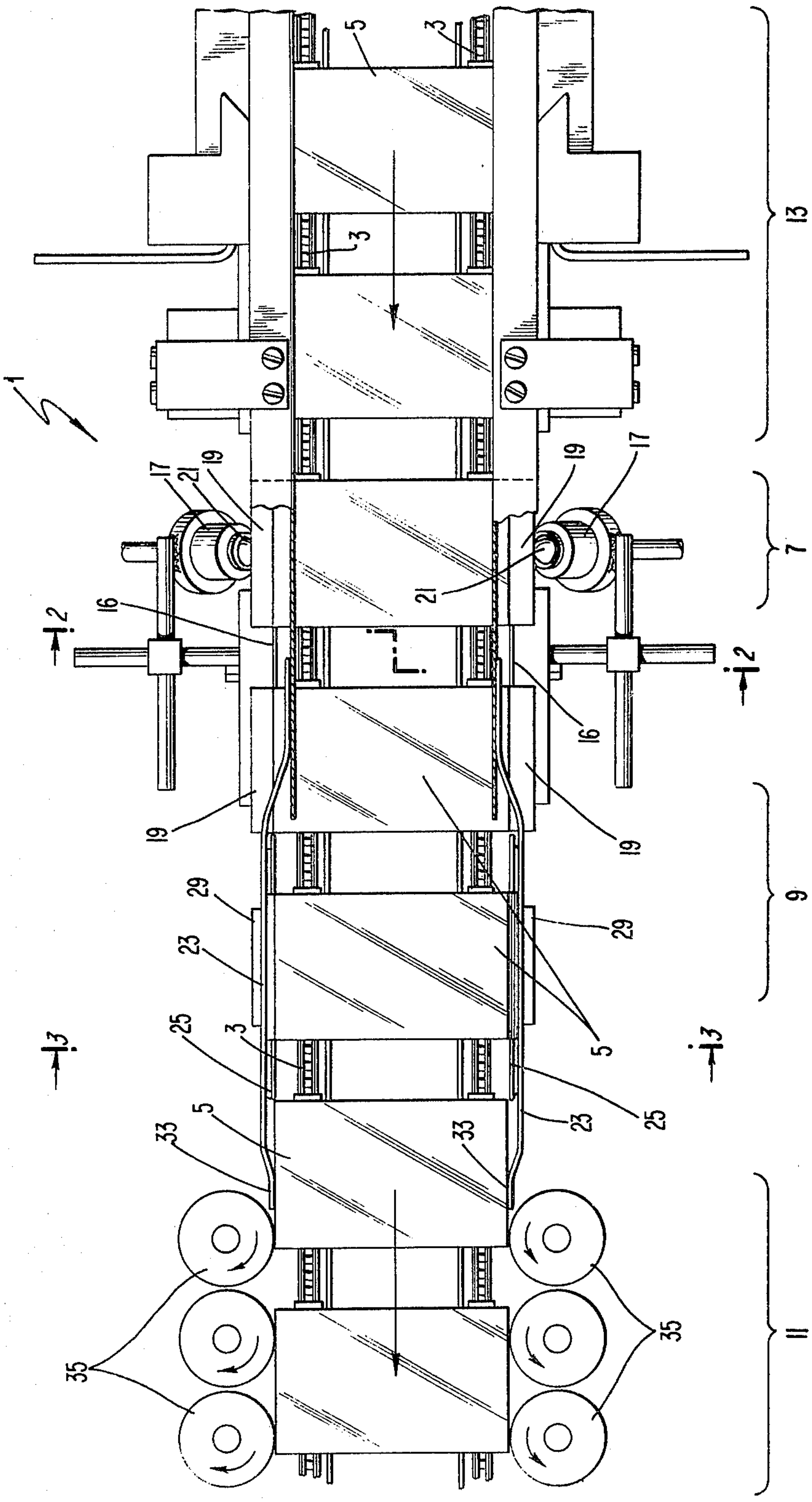
FIG. 1 is the top view of carton sealing apparatus useful for forming the heat-sealable carton of the present invention.

In FIG. 1, one type of apparatus for closing a heat-sealable carton of the present invention is shown. Carton closing apparatus 1 includes a conveyor 3 for transporting cartons 5 past an adhesive spraying section 7, a heating and drying section 9, and a sealing section 11. While the preferred embodiment is shown in an environment of carton closing, it should be understood that the principles of the invention are applicable to carton forming also.

Thus, carton 5 is formed from a coated paperboard blank and is normally sealed at the corners and along one edge to form the rectangular carton of FIG. 1. Coated paperboard is preferred when the carton is to be used as a container for food items, since the coating will prevent absorption of moisture, grease, or other liquids from the food items. A preferred type of coating is a polyester resin. The coating is applied to the paperboard blank by coating apparatus well known in the art. The preferred embodiment of the carton-closing machine and the "Charlotte" type carton are shown for illustrative purposes in accordance with the broadest aspects of the present invention. It should be understood that the principles involved may be applied to carton forming machines, as well as to other types of cartons, with equal advantages gained.

Figure 2:
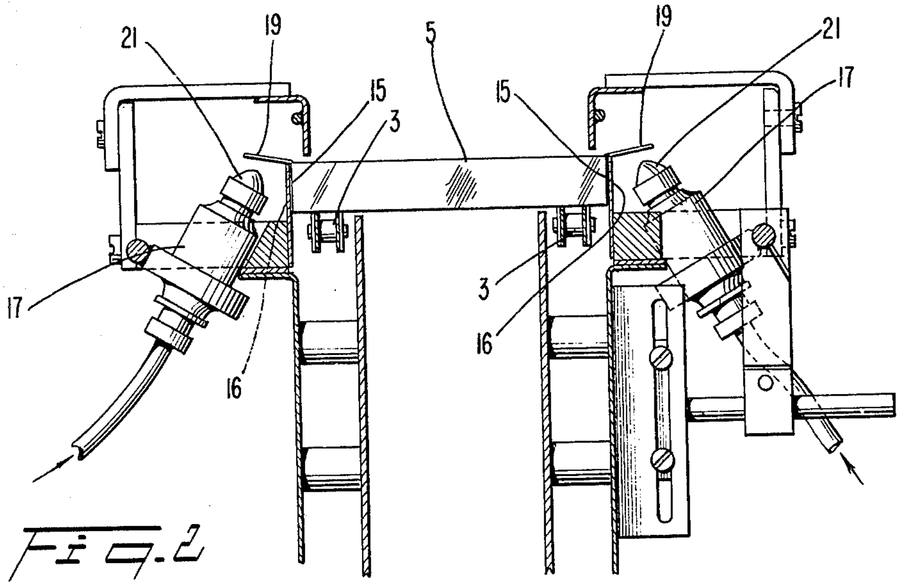
FIG. 2 is a sectional view of the carton-sealing apparatus taken along lines 2—2 of FIG. 1, showing the adhesive spraying section.

Coated cartons 5 may contain a food item inserted prior to loading onto closing apparatus 1. The cartons are first conveyed past a carton flap folding section 13 (right to left in FIG. 1) in which closure flaps 15 on opposite sides of carton 5 are folded inwardly. Each carton is then conveyed through adhesive spraying section 7, in which a pair of spraying heads 17 spray a water-based adhesive which exhibits high contact tackiness when dry, such as an aqueous emulsion of polyvinyl acetate, on the remaining unfolded carton closure flaps 19, as shown in FIG. 2. Each sprayer 17 includes a nozzle 21 which produces a fine mist of the water-based adhesive when it is sprayed under pressure on carton flaps 19, as more clearly shown in FIG. 4. Retainer plates 16, disposed adjacent sprayers 17 and parallel to conveyor 3, serve to hold the lower flaps up in position as the spraying step is carried out.

Figure 3:
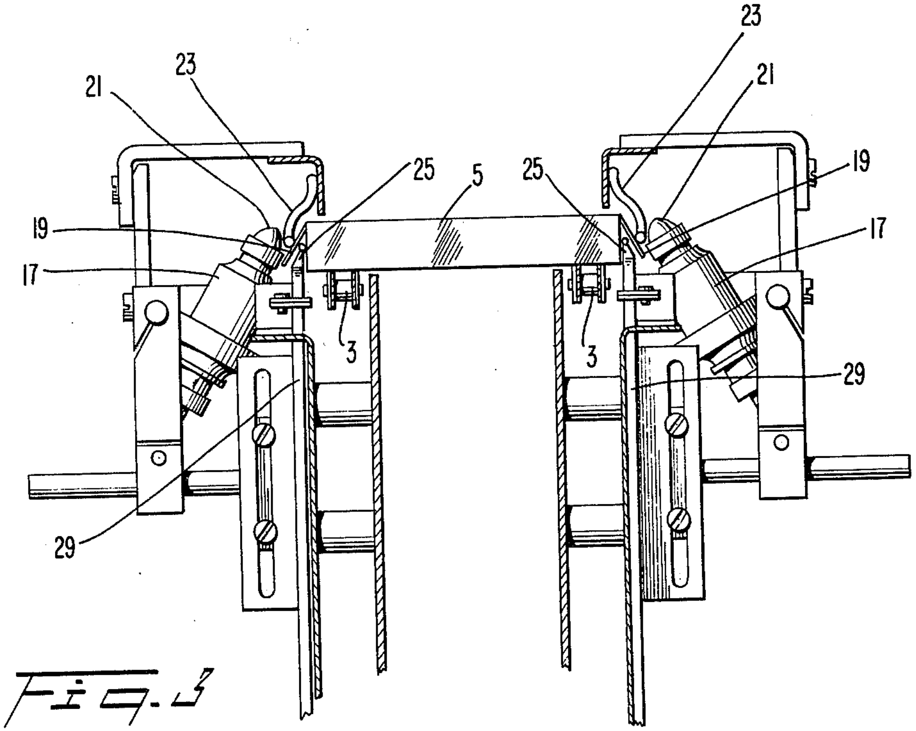
FIG. 3 is a sectional view of the carton-sealing apparatus taken along lines 3—3 of FIG. 1, showing the adhesive drying and heating sections.

After the water-based adhesive has been applied to the carton flaps, carton 5 is conveyed to the adhesive heating and drying section 9. A pair of rails 23, disposed substantially parallel and adjacent to either side of conveyor 3, progressively plow flaps 19 of carton 5 downwardly until flaps 19 are in the position shown in FIG. 3. A pair of forced air heater nozzles 25 are disposed on either side of conveyor 3, with nozzle head 17 arranged to project between carton 5 and flaps 19, as shown more clearly in FIG. 6. Heated air is forced under pressure through channels 29 of heater 25 and exits through slotted openings 31 formed on angled heater head 27. Flaps 19 are held substantially parallel to the angled faces 27 of heaters 25 by rails 23. Heated air from heater 25 is directed onto the water-based adhesive coated surface of flaps 19 at a temperature and for a time sufficient to rapidly dry the water-based adhesive and activate the thermosetting adhesive coating. The air is heated to approximately 620° C. (1150° F.) and the surface of flaps 19 momentarily reaches a temperature of about 110° C.-290° C. (225° F. to 550° F.) The opposite flap 15 (FIG. 6) is shielded by the closed back of the head so that the flap 15 remains cool so as to be operative as a heat sink, as will be more fully explained below.

Carton 5 is then conveyed to sealing section 11. End portions 33 of rails 23 are formed with a bend directed downwardly to force flaps 19 of cartons 5 into contact with the folded carton flap 15 as carton 5 is conveyed past the rails. The water-based adhesive, which has been substantially dried and rendered tacky by the heating apparatus, effects an almost instantaneous adhesive seal between the mating surfaces of the carton flaps. The sealed carton flaps are then subjected to pressure by pressure rollers 35, disposed on opposite sides of conveyer 3, which press the carton flaps securely together. This action insures a more intimate adhesive seal between the water-based adhesive and the precoated carton surfaces and aids in the setting and curing process of the thermosetting adhesive, as more fully described below.

The sealing method of the present invention enables cartons 5 to proceed at all times along conveyor 3 in a continuous stream and at a constant relatively high speed, thus providing a highly efficient carton closing system.

Referring to FIGS. 7A through 7D, the process of closing of the heat-sealable carton of the present invention is more fully shown. One or more mating surfaces of the carton, such as carton flap panels 15 and 19, are coated with a thermosetting adhesive 37 well known in the art. A preferred type of thermosetting adhesive is a thermosetting polyester resin. Such resins, when bonded under appropriate conditions of heat and pressure result in an excellent adhesive bond or seal between the mating surfaces once thermosetting adhesive 37 has cooled and cured. Thermosetting adhesive 37 is also highly resistant to debonding or flowing at elevated temperatures after it is cured and provides an effective adhesive seal between the carton flaps even at temperatures in the neighborhood of 217° C.–425° F., as, for example, when the carton is to be used as a container for cooking or reheating food directly in an oven. The use of a thermosetting adhesive as the sole bonding means for carton panels, as taught by the prior art, has a major draw-back. This is that thermosetting adhesives do not adhere or seal well until pressure is applied to the surfaces to be sealed and the adhesive is allowed to cool and cure. Thus, some special means must be provided to hold the carton flap panels together during the cooling and curing stages. Although some means for rapidly cooling the sealed carton panels could be provided, such as a cooling bar or a stream of cooling air, this increases the production costs and still does not eliminate the curing time during which the panels must be held together. The number of cartons which can thus be sealed in a given amount of time is relatively low when using this type of seal.

In order to overcome the disadvantages of prior art methods of heat-sealing cartons, the present invention provides a step in which the fine mist of a water-based adhesive, exhibiting high contact tackiness when dry, is sprayed as a discontinuous film on the coated flap surface, as shown in FIG. 7B. The water-based sprayed adhesive 39, which preferably is an aqueous emulsion of polyvinyl acetate, such as that manufactured by Jedco, Inc. of Mt. Vernon, New York, under the trade name of "JED-BOND", is sprayed on the coated carton flap surface by sprayer 17. Other types of polyvinyl acetate emulsion, such as Elvacet #80–900, manufactured by DuPont, can be used. The droplets of adhesive 39 cling readily to pre-applied polyester coating 37. Heat is then applied to the sprayed surface by heater 25 which substantially dries the water-based adhesive. The temperature of the hot air directed from the heater onto the carton surfaces is adjusted so as to rapidly dry the water-based adhesive. The precise temperature varies depending on the type of water-based adhesive used. With the preferred aqueous emulsion of polyvinyl acetate sprayed as a discontinuous film on the carton surface, the rapid blast of heated air is effective to almost completely dry the water-based adhesive within ½ second. With polyvinyl acetate adhesive, a preferred drying temperature range is also between 110° C.–290° C. (225° F.–550° F.).

When adhesive 39 substantially dries, as shown in FIG. 7C, it exhibits a high degree of contact tackiness. In addition, during drying, the adhesive droplets are advantageously spread somewhat due to the pressure of the stream of drying air. The exposed thermosetting adhesive coating is also activated by the heated air from heaters 25. Advantageously, the evaporation of water vapor from the water-based adhesive emulsion assits in preventing the carton flaps from over-heating and charring. This is especially important where the outside of the carton is printed and charring can spoil the appearance of the carton.

The coated carton panels are next plowed or folded down by terminal rail portions 33. This action places the mating surfaces of the carton in face-to-face contact. The tacky, water-based adhesive instantly bonds the pair of the panels together to form an adhesive seal, as shown in FIG. 8. The bonding is between the coated and/or uncoated surfaces of the facing flap panels. Bonding by the water-based adhesive occurs directly between the precoated surface and/or the mating paperboard surface as sufficient pressure is applied.

Preferably, only one of the mating pairs of the carton panel is coated with water-based adhesive 39 and heated by the apparatus shown in FIG. 6. The other carton panel 15, which has previously been erected by the forming machinery, is unheated and acts as a heat sink for the heated panel 19 to promote rapid cooling of the adhesive seal therebetween. In other words, the absorbed heat of the small adhesive globules and the outer panel 19 is quickly drawn out by the cold inner panel 15 of the carton. Because of this, the length of the compression section 11 is minimized, keeping the space requirement for the packaging line to a minimum while allowing the machinery to operate at maximum speed. The sealed carton flaps are placed under pressure by the pressure rollers 35 of compression section 11 causing the thermosetting coating 37, which has been previously activated during the heating step, to flow and form the molecular interconnection between the compressed panels. The combination of heat and pressure causes the thermosetting polyester coating to form a final, permanent bond or seal between the panels which exhibits excellent integrity at high temperatures.

The thermosetting adhesive (polyester coating 37) sets and cures as the carton panels cool. Once cured, the combination adhesive seal is provided by the coating 37 and the globules of adhesive 39 and resists debonding even at temperatures encountered in a heated cooking oven (up to approximately 230° C. or 450° F.). It is to be noted that since the water-based adhesive is applied as a discontinuous film, it does not interfere with the curing or setting and bonding of the thermosetting adhesive which cannot be reactivated in the oven.

The combination of thermosetting heat-activated adhesive and high tack water-based adhesive enables the mating surfaces of the carton to be rapidly sealed by the described automatic closing machinery. The water-based adhesive, when substantially dried, enables the carton flaps to be sealed in as little as one-half second. The rapid sealing afforded by the water-based adhesive, secures the mating surfaces of the carton flaps together and allows the thermosetting adhesive sufficient time to cool and cure. Once the thermosetting adhesive has cured or set, the combination adhesive maintains the seal between the carton flaps even at temperatures above which the adhesives by themselves were previously thought to be ineffective.

The above-described method is particularly useful in forming a carton which can be placed directly into an oven to heat or cook food items contained therein. So-called "ovenable" cartons can be sealed rapidly (as many as 150 per minute on a single conveyor line) by the described sealing method and exhibit good sealing properties at freezer temperatures (approximately −17° C. or 0° F. for frozen foods) and at oven heating temperatures (up to 230° C. or 450° F.). An ovenable container, such as described, can be formed on conventional closing machinery with little modification to the machinery. Of course, as mentioned above, other apparatus for performing the method of closing and/or forming a heat-sealable carton could be used in accordance with the broad aspects of the present invention.

While the method of closing a heat-sealable carton and the description of the carton itself has been described in considerable detail, it is understood that various changes and modification may occur to persons of ordinary skill in the art without departing from the spirit and scope of the invention as defined in the appended claims.

I claim:

1. A method of bonding a carton having at least a pair of mating surfaces to be sealed, the sealed surfaces exhibiting a high resistance to heat after sealing, comprising the steps of:

coating at least one of said carton surfaces with a heat-activated thermosetting adhesive;

applying a water-based adhesive emulsion exhibiting high contact tackiness when substantially dry on at least one of said surfaces to form a discontinuous film so that intermittent areas of said thermosetting adhesive are defined and exposed;

heating at least said water-based and thermosetting adhesive coated surfaces to a temperature sufficient to at least partially dry said water-based adhesive and activate said thermosetting adhesive for sealing;

subsequently placing said mating carton surfaces in contact with each other;

setting said thermosetting adhesive against reactivation by heat after sealing; and applying pressure for a time sufficient to seal said contacting surfaces together.

2. The method of claim 1 wherein said heat-activated thermosetting adhesive comprises a polyester resin.

3. The method of claim 1 wherein said water-based adhesive is sprayed as a fine mist.

4. The method of claim 3 wherein said water-based adhesive comprises an aqueous emulsion of polyvinyl acetate which.

5. The method of claim 1 wherein said surfaces coated with said adhesives are heated to a temperature within the range of 110° C.–290° C. to dry said water-based adhesive and to activate said heat-activated thermosetting adhesive.

6. The method of claim 1 wherein said step of heating said coated surfaces comprises the step of directing a stream of heated air against said coated surfaces.

7. The method of claim 1 wherein said pressure is applied for a time period within the range of 0.5 seconds to 2.5 seconds.

8. The method of claim 1 wherein only one of said carton surfaces is coated with both said heat-activated adhesive and said water-based adhesive.

9. The method of claim 1 wherein both of said carton surfaces are coated with said heat-activated thermosetting adhesive and one of said coated surfaces is coated with said water-based adhesive.

10. The methods of either claims 8 or 9 wherein said carton surface not coated with said water-based adhesive is not heated during said heating step and acts as a heat sink for said heated surface during sealing.

11. The method of claim 1 wherein both of said carton surfaces are coated with said heat-activated thermosetting adhesive and said water-based adhesive.

12. A method of bonding a carton having at least a pair of mating surfaces to be sealed, the sealed surfaces exhibiting a high resistance to heat after sealing comprising the steps of:

coating at least one of said carton surfaces with a heat-activated thermosetting adhesive;

spraying a water-based adhesive emulsion only on said one coated carton surface, said water-based adhesive being sprayed as a fine mist sufficiently light to form a discontinuous film on said coated surface so that intermittent areas of said thermosetting adhesive are defined and exposed, said water-based adhesive exhibiting high contact tackiness when substantially dry;

heating only said coated carton surface to a temperature sufficient to at least partially dry said water-based adhesive and activate said thermosetting adhesive for sealing;

subsequently placing said mating carton surfaces in contact with each other;

setting said thermosetting adhesive against reactivation by heat after sealing; and applying pressure for a time sufficient to seal said contacting surfaces together.

* * * * *